(12) United States Patent
Foland, Jr.

(10) Patent No.: US 8,498,186 B2
(45) Date of Patent: Jul. 30, 2013

(54) CIRCUITS, ARCHITECTURES, APPARATUSES, SYSTEMS, ALGORITHMS AND METHODS AND SOFTWARE FOR TIMING CALIBRATION FOR OPTICAL DISC RECORDING

(75) Inventor: William R. Foland, Jr., Golden, CO (US)

(73) Assignee: Marvell World Trade Ltd., St. Michael (BB)

( * ) Notice: Subject to any disclaimer, the term of this patent is extended or adjusted under 35 U.S.C. 154(b) by 1125 days.

(21) Appl. No.: 12/352,924

(22) Filed: Jan. 13, 2009

(65) Prior Publication Data

US 2009/0116353 A1 May 7, 2009

Related U.S. Application Data

(63) Continuation-in-part of application No. 11/646,098, filed on Dec. 26, 2006, now Pat. No. 7,839,739.

(60) Provisional application No. 60/776,588, filed on Feb. 24, 2006, provisional application No. 61/020,887, filed on Jan. 14, 2008, provisional application No. 61/027,992, filed on Feb. 12, 2008.

(51) Int. Cl.
*G11B 15/52* (2006.01)
*G11B 5/09* (2006.01)
*G11B 20/10* (2006.01)

(52) U.S. Cl.
USPC .................. 369/47.53; 369/47.27; 369/59.17

(58) Field of Classification Search
USPC ................. 369/47.53, 47.27, 59.17
See application file for complete search history.

(56) References Cited

U.S. PATENT DOCUMENTS

| 5,513,166 A | 4/1996 | Tokumitsu et al. |
| 6,101,159 A * | 8/2000 | Shoji et al. ................. 369/47.19 |

(Continued)

FOREIGN PATENT DOCUMENTS

| JP | 04-137223 A | 5/1992 |
| JP | A-05-238495 | 2/1993 |

(Continued)

OTHER PUBLICATIONS

William R. Foland Jr.; "Circuits, Architectures, Apparatuses, Systems, Algorithms and Methods and Software for Timing Calibration for Optical Disc Recording"; International Search Report, dated Feb. 26, 2009; International Application No. PCT/US2009/030878; 2 pages; International Searching Authority/United States Patent and Trademark Office, Alexandria, Virginia, US.

(Continued)

*Primary Examiner* — Aneeta Yodichkas (57) ABSTRACT

The present disclosure relates to methods, software, and apparatuses for correcting reading and/or writing operations in an optical storage medium. The methods generally include reading a region of an optical storage medium to produce a readback signal, measuring timing offsets for a plurality of the data edges (including one or more non-guide edges), and storing an offset correction for at least one of the plurality of edges based on a measured offset of at least one of the plurality of edges relative to a predetermined offset. The disclosure advantageously enables precise measurement of timing offsets in optical storage media and correction of the measured offsets for timing offsets attributable to edge jitter, timing loop drift, or factors independent of variations in the medium and/or write operation characteristics.

33 Claims, 5 Drawing Sheets

U.S. PATENT DOCUMENTS

| | | |
|---|---|---|
| 6,345,033 B1 | 2/2002 | Hayashi |
| 7,068,579 B2 | 6/2006 | Tasaka |
| 2003/0115534 A1 | 6/2003 | Kojima et al. |
| 2004/0008599 A1 | 1/2004 | Hogan |
| 2004/0017752 A1* | 1/2004 | Furumiya et al. .......... 369/47.53 |
| 2005/0058034 A1 | 3/2005 | Ando et al. |
| 2005/0174906 A1* | 8/2005 | Narumi et al. ............. 369/47.53 |
| 2006/0067185 A1 | 3/2006 | Ueki et al. |
| 2007/0121461 A1 | 5/2007 | Kobayashi et al. |
| 2007/0165501 A1 | 7/2007 | Iida et al. |

FOREIGN PATENT DOCUMENTS

| | | |
|---|---|---|
| JP | A-06-309669 | 11/1994 |
| JP | A-10-055540 | 2/1998 |
| JP | 10-320777 A | 12/1998 |
| JP | 2000-123369 | 4/2000 |
| JP | A-2001-101807 | 4/2001 |
| JP | A-2003-151210 | 5/2003 |
| WO | WO 02/089123 | 11/2002 |
| WO | WO 2005/029479 A1 | 3/2005 |
| WO | WO 2007/138479 A2 | 12/2007 |

OTHER PUBLICATIONS

William R. Foland Jr.; "Circuits, Architectures, Apparatuses, Systems, Algorithms and Methods and Software for Timing Calibration for Optical Disc Recording"; Written Opinion of the International Searching Authority; International Application No. PCT/US2009/030878; Dated Feb. 26, 2009; 5 pages; International Searching Authority/United States Patent and Trademark Office, Alexandria, Virginia, US.

Mar. 11, 2013 Office Action issued in Chinese Patent Application No. 200980102182.0 (with translation).

\* cited by examiner

CIRCUITS, ARCHITECTURES, APPARATUSES, SYSTEMS, ALGORITHMS AND METHODS AND SOFTWARE FOR TIMING CALIBRATION FOR OPTICAL DISC RECORDING

RELATED APPLICATIONS

This application is a continuation-in-part of U.S. patent application Ser. No. 11/646,098, filed Dec. 26, 2006 now U.S. Pat. No. 7,839,739, incorporated herein by reference in its entirety, which in turn claims the benefit of U.S. Provisional Patent Application No. 60/776,588, filed Feb. 24, 2006, also incorporated herein by reference in its entirety. This application also claims the benefit of U.S. Provisional Patent Application No. 61/020,887, filed Jan. 14, 2008, the contents of which are incorporated herein by reference in its entirety, and the benefit of U.S. Provisional Patent Application No. 61/027,992, filed Feb. 12, 2008, which is incorporated herein by reference in its entirety. This application may also be related to U.S. patent application Ser. No. 12/352,950, filed Jan. 13, 2009, incorporated herein by reference in its entirety.

FIELD OF THE INVENTION

The present invention generally relates to the field of writing to an optical storage medium. More specifically, embodiments of the present invention pertain to methods and apparatuses for the calibration of timing offsets for writing to an optical storage medium.

BACKGROUND

Optical storage technology comprises a wide and growing variety of disc and application specifications. Disc specifications include, for example, CD-ROM and DVD-ROM for pre-recorded discs, CD-R, DVD-R, DVD+R, Blu-Ray Disc Recordable (BD-R), etc. for write-once discs, and CD-RW, DVD-RW, DVD-RAM, DVD+RW, BD-RE, etc. for rewritable discs. The disc format specifications generally define the physical characteristics of the disc (e.g., mechanical properties, optical signal characteristics, physical arrangement, writing methods, and testing conditions). Application specifications include DVD-Video for video content, DVD-Audio for audio content, and DVD-VR and DVD+VR for real-time video recording (e.g., in camcorders and personal video recorders [PVRs]).

In many optical disc specifications, an optical disc may comprise two areas, including a user data area and a disc information (lead-in) area. The user data area is generally used to write application data, including video, audio, information tables, file system data, etc. The disc information (lead-in) area generally includes data such as disc size, disc type, disc layout, etc. In some optical disc specifications (e.g., CD-R, DVD-R, DVD+R, BD-R, etc.), the disc generally can be written only once. In other disc specifications or formats (e.g., CD-R/W, DVD+RW, BD-RE, etc.), data may be written to the disc more than once.

Optical storage media generally store data as a sequence (e.g., a continuous track) of "pits" (or "marks") and "lands" (or "space") on a data-bearing surface that is made reflective by the application of a metallic layer during manufacture. The "lands" are generally parts of the track that are not pits. Pits in read-only storage media are generally molded into the data bearing surface when the discs are formed. Recordable and re-writable discs are generally produced as blanks, and have only a preformed groove or "pre-groove" (together with a limited amount of embossed data in most cases) included during molding.

Data is stored on recordable or re-writable optical storage media using the same pit-land principle, however the pits are generally added by "burning" a special phase-change material layer applied to the disc substrate. In order to write to a recordable or re-writable disc, an optical pick-up head of an optical disc is generally equipped with a higher power write laser in addition to the read laser. Alternatively, one laser can generally perform both functions by operating at lower power output for read operations, and a range of higher power outputs for write operations.

The amount of power used to burn pit features is critical to the shape of those features. The geometry of the shape of the pit features affects the read-back performance of read-back systems. Recordable and re-writable optical storage media are produced by a wide variety of vendors using different materials. Thus, an appropriate writing power level for one medium may be too high or too low for another medium, even if both media are manufactured in accordance with the same specification. Therefore, most optical storage medium specifications include some facility for a vendor to specify an optimal power level. However, even the vendor specified power level may be suboptimal due to normal process variations in the medium and/or the recording device or operational variations in the recording device. Therefore, most optical storage medium specifications also define one or more areas of the media for performing optimal power calibration (OPC) by writing data at various power levels and reading back the data to determine an optimal writing power level. The amount of space available for OPC operations may be limited, and the OPC operations may need to be run multiple times if data is written to the medium in multiple sessions and/or on using multiple different recording devices on the same medium. Consequently, it is desirable for optical storage medium recording devices to obtain the most accurate calibration data possible.

As described above, data is generally written to an optical storage medium by producing marks and spaces on the disc. Each mark and/or space has a "run-length" (e.g., the data "11100011" comprises a 3T mark, a 3T space, and a 2T mark). Many conventional optical storage formats encode data written to the disc according to a run-length limited code, such that every mark and space has a minimum and/or maximum run-length. Some writing errors, including timing offset errors and amplitude variations, correspond to particular run-length transitions (e.g., a transition from a 3T mark to a 2T space, from a 6T space to a 3T mark, etc).

In an exemplary OPC system, as described in U.S. Patent Application Publication No. 2007-0201331 (the relevant portions of which are incorporated herein by reference), data is written to an optical storage disc (or other optical storage medium) according to a predetermined pattern and using a predetermined variety of power levels, timing offsets, and/or other adjustable writing characteristics. The patterns may be selected, for example, to include a variety of run-length transitions. Thus, the system may determine optimal writing characteristics for each transition type by correlating readback characteristics of data read from the disc with the predetermined pattern data and the known writing characteristics.

Furthermore, conventional methods and devices for reading from an optical storage medium perform timing recovery to synchronize reading operations with the data read back from the medium. Timing recovery may be used, for example, to determine which sample and/or samples in a readback signal correspond to the data stored on the medium. When conventional timing recovery makes an incorrect decision, the readback signal may be misinterpreted. During OPC reading operations it is particularly important to correctly synchronize with the readback signal so that calibration measurements are accurate. Therefore, it is also desirable to provide for effective correction of a readback signal (e.g., reduction of jitter in time and/or amplitude) while reading data that may have been written under a variety of conditions (e.g., calibration pattern data written to the optical storage medium using several different writing power levels, timing offsets, etc.).

In a related exemplary OPC system, as described in U.S. patent application Ser. No. 12/352,950, filed Jan. 13, 2009 (the relevant portions of which are incorporated herein by reference), the timing recovery loop takes advantage of the predetermined readback pattern and of the relative stability of low-frequency transitions (e.g., transitions between long runlengths such as a 6T/6T transition) in order to recover the timing of the readback signal. Thus, the predetermined data may include "guide edges" with long run-lengths. When the OPC system detects a timing offset in one of these guide edges, the offset may be used to adjust the readback timing. For example, the timing offset or a derivative thereof may be provided as an error input to a conventional phase-locked loop (PLL).

PLLs generally do not react instantaneously to offset errors. As a result, the timing offsets of both guide edges and non-guide edges may be affected by PLL drift and/or other artifacts of the timing recovery process. However, it may be desirable to precisely measure timing offsets caused by variations in the optical storage medium and/or the writing characteristics used. Therefore, it is desirable to subtract any timing offsets attributable to drift in the timing loop or to other factors that may be independent of variations in the medium and/or writing characteristics.

SUMMARY

Embodiments of the present invention relate to methods, software, and apparatuses for correcting reading and/or writing operations using an optical storage medium. The methods generally include steps for reading a region of an optical storage medium to produce a readback signal, measuring timing offsets for a plurality of the data edges (including one or more non-guide edges), and storing an offset correction for at least one of the plurality of edges based on a measured offset of at least one of the plurality of edges relative to a predetermined offset.

In an exemplary embodiment, the offset correction may be calculated by linearly extracting an offset correction value for non-guide edges based on a distance in bits from one or more guide edges. The offset correction may also be calculated based on measured timing offsets of a preceding guide edge and a succeeding guide edge. Thus, the offset correction may be linearly extracted based on a distance in bits from the preceding guide edge and a distance in bits from the succeeding guide edge. Alternatively, the offset correction may be calculated from non-guide edges, based on the measured offset of at least first and second non-guide edges.

The apparatus may comprise a reading module configured to read a region of the optical storage medium, a measurement module configured to measure timing offsets, and logic configured to calculate an offset correction for at least one of the plurality of edges. Reading the region of the optical storage medium produces a readback signal that comprises a plurality of edges, including one or more non-guide edges. The timing offsets are measured for at least a first non-guide edge and at least a second edge (which may be a second non-guide edge or a first guide edge). The offset correction(s) are based on a measured offset of at least one of the first and second edges.

In an exemplary embodiment, the calibration region of an optical disc is written with predetermined pattern data. Thus, the known pattern data may be processed to determine when to take measurements of the readback channel (e.g., during or around expected transition edges) and to produce measurement instructions (e.g., to instruct a measurement circuit or other component to measure the readback channel at a particular time). For example, the pattern data may be processed to locate guide edges and to produce guide edge measurement instructions for expected transitions. The method may also include measuring the timing offsets in response to the measurement instructions and/or calculating the corrected offset in response to the measurement instructions.

The data read from the optical storage medium generally includes the predetermined pattern data. The pattern data is generally known prior to reading from the medium, so that the expected shape of the readback signal can be predicted. Thus, the method may include writing the pattern data to the region of the optical disc prior to reading the pattern data.

In a further embodiment, the method includes writing the pattern data to the region of the optical storage medium in accordance with calibration instructions. The calibration instructions are generally synchronized with the pattern data. Thus, the method may include receiving a bitstream that includes the calibration instructions and the pattern data. For example, the bitstream may have the calibration instructions superimposed on the pattern data.

Embodiments of the method may also include measuring edge timing offsets of the readback signal in accordance with the calibration instructions (e.g., by processing the instructions along with the pattern data to produce the measurement instructions) and calculating a writing offset for writing data to the optical storage medium (e.g., an optimal power level, timing offset, etc.) based on one or more of the corrected offsets. For example, the method may include comparing one or more of the measurement results to one or more expected values based on the pattern data. In a further embodiment, the method may include correlating one or more of the measurement results with one or more of the calibration instructions (e.g., correlating the results with power levels or other characteristics set by the instructions during writing). Alternatively, the method may include correlating one or more of the measurement results with one or more run lengths in the pattern data.

In another embodiment, processing the pattern data may include analyzing the pattern data to find useful measurement locations. For example, the pattern data may be analyzed to find particular run-lengths, mark/space combinations, etc. Thus, the method may include producing the guide edge instructions to correspond to a transition in the mark/space combination. In one exemplary embodiment, the guide edge instruction may correspond to a transition between a 6T mark and a 6T space (or vice versa) in the pattern data.

The guide edge instruction may be synchronized with an expected transition in the readback signal (e.g., where the readback signal includes the pattern data). Measuring the one or more characteristics of the readback signal may include measuring a time offset between the guide edge instruction and a transition in the readback signal (e.g., where the readback signal should have a transition, as determined by the pattern data).

In an exemplary embodiment, the method includes adjusting an output of a phase locked loop (PLL) in accordance with the time offset (e.g., to speed up or slow down the PLL to reduce jitter in the readback signal) of the guide edges. For example, the method may include storing a plurality of time offset measurements in accordance with the guide edge instructions and calculating the PLL adjustment in accordance with the stored time offset measurements.

The algorithms, computer program(s) and/or software, implementable and/or executable in systems equipped with a general purpose microprocessor and/or a conventional digital signal processor, may be configured to perform one or more steps of the method and/or one or more operations of the hardware described herein. The circuits, devices, apparatuses, architectures, and/or systems generally comprise those that include one or more components embodying one or more of the inventive concepts disclosed herein.

The present invention advantageously provides the ability to precisely measure timing offsets caused by variations in the optical storage medium and/or the writing characteristics used, and to correct the measured offsets for timing offsets attributable to drift in the timing loop or to other factors that may be independent of variations in the medium and/or writing characteristics.

DETAILED DESCRIPTION

Reference will now be made in detail to various embodiments of the invention, examples of which are illustrated in the accompanying drawings. While the invention will be described in conjunction with the embodiments described below, the embodiments are not intended to limit the invention. On the contrary, the invention is intended to cover alternatives, modifications, and equivalents that may be included within the scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "bitstream," "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

Finally, the terms "mark," "space," "pit," and "land" generally refer to features written (and/or not written) onto a recordable optical storage medium, and may represent binary values and/or or other data encoded on the medium. The semantic values of "marks and spaces" and/or "lands and pits" may vary depending on the format of the optical storage medium, but these terms are generally given their art-recognized meanings.

The invention, in its various aspects, will be explained in greater detail below with regard to exemplary embodiments.

Exemplary Method for Timing Calibration

Figure 1:
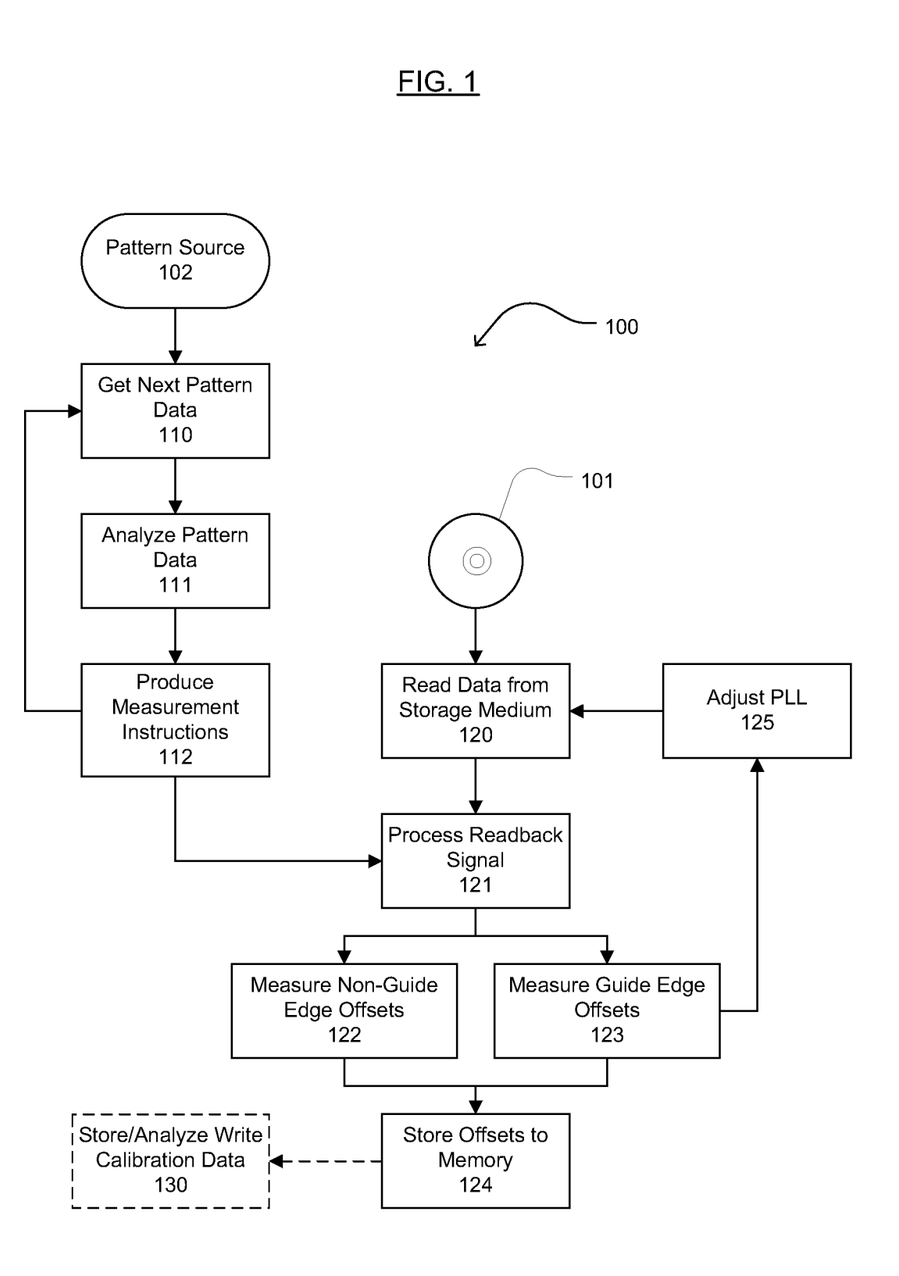
FIG. 1 is a flowchart of an exemplary method according to an embodiment of the present invention.

FIG. 1 shows an exemplary method 100 for optimal power (and optionally, timing) calibration (OPC). Method 100 generally includes step 120 for reading a region of optical storage medium 101 to produce a readback signal, steps 110-112 for processing predetermined pattern data to produce one or more measurement instructions, steps 121-123 for processing the readback signal and measuring guide edge and non-guide edge timing offsets in response to the measurement instructions to produce one or more measurement results. In various embodiments, the optical storage medium 101 may comprise, for example, an optical disc such as a write-once optical disc (e.g., a CD-R, DVD-R, or DVD+R, BD-R, etc.) or a rewritable optical disc (e.g., a DVD-RW, DVD+RW, or DVD-RAM, BD-RE, etc.).

Method 100 begins at step 110 to get pattern data from pattern source 102. The pattern data is generally known prior to reading any data from the storage medium, so that the expected shape of the readback signal can be predicted. Thus, during or before step 120 of reading data from the storage medium a replica of the known written signal may be analyzed at step 111.

Figure 3:
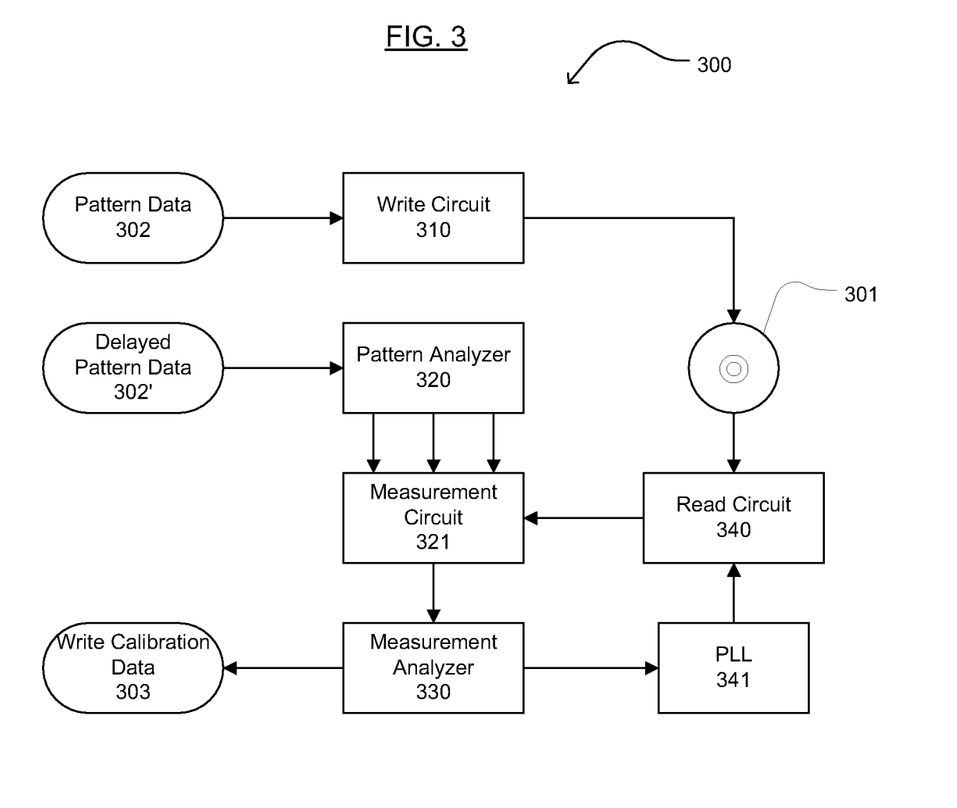
FIG. 3 is a diagram showing an exemplary apparatus according to an embodiment of the present invention.

In one exemplary embodiment, the pattern data may have been written to medium 101 by a method 300 of FIG. 3 for writing pattern data to the optical storage medium using a variety of writing characteristics. Pattern source 102 may, for example, comprise a memory, (e.g., a memory that also provides the pattern data to be written to the optical storage medium), a process, circuit, or other means for generating the pattern data according to an algorithm, a buffer (e.g., a buffer that stores pattern data that was written to the optical storage medium 101), etc.

At step 111, the pattern data is analyzed to find useful measurement locations in the readback signal. For example, the pattern data may be analyzed to find particular run-lengths, mark/space combinations, etc. During optimal power calibration (OPC) operations (which may optionally further include timing calibration operations), it is particularly important to obtain accurate measurements of the readback signal in order to select the best writing characteristics.

Conventional methods and devices for reading from an optical storage medium perform timing recovery to synchronize reading operations with the data read back from the medium. However, a conventional OPC write process may make it more difficult to properly adjust the timing loop because the write characteristics (e.g., power, timing offset, etc.) used to write the data may vary considerably. Therefore it is desirable to stabilize jitter or other variations in the timing phase offset, envelope offset, and/or envelope gain of the readback signal.

Longer run-lengths of marks and/or spaces are likely to vary less than shorter run-lengths. As a result transitions between longer run-lengths (e.g., a transition between a 6T mark and a 6T space or vice versa) are likely to be more stable than transitions to or from shorter run-lengths, and may be used as guide edges. Thus, step 111 may include analyzing the pattern data to find such transitions. In addition to finding transition between long run-lengths of marks and/or spaces, step 111 may also include locating other non-guide edge transition in the pattern data.

At step 112, measurement instructions are produced in accordance with the analysis of step 111. The measurement instructions may comprise signals, operational codes, or other messages to measure one or more characteristics of the readback signal at a particular time (e.g., at a time when the readback signal is expected to correspond to one or more features of the pattern data). For example, the measurement instructions may include timing offset measurement instructions synchronized with an expected transition in the readback signal. Timing offset instructions may include guide edge measurement instructions synchronized with stable edges in the pattern data for adjusting the readback timing loop and/or other timing offset instructions (e.g., for calibrating write characteristics). The measurement instructions may also include envelope measurement instructions (e.g., instruction to measure an amplitude or other characteristic of the envelope of the readback signal) and/or instructions to measure other characteristics of the readback signal.

Figure 2:
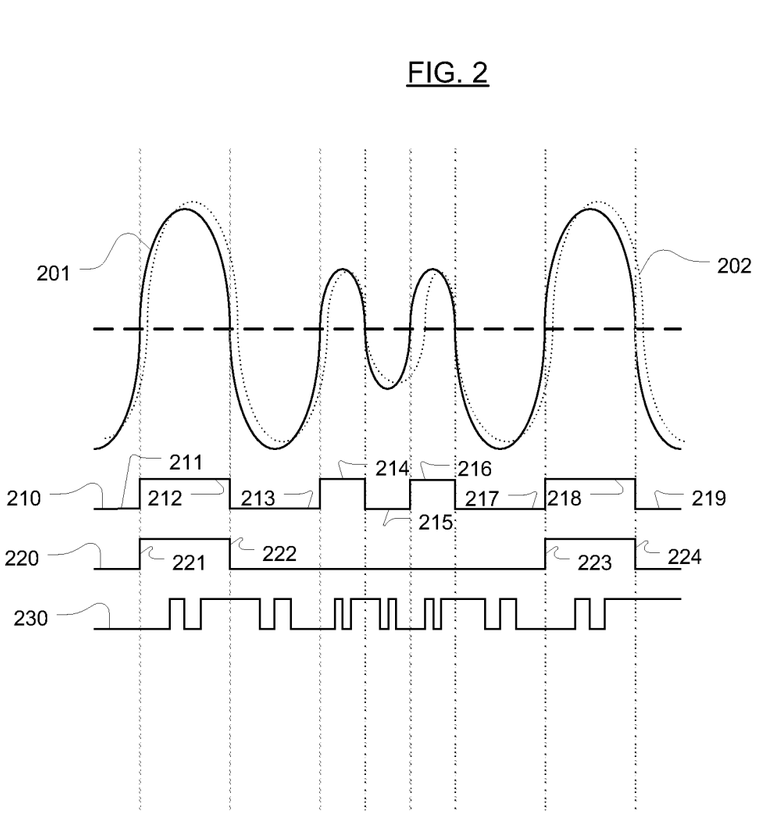
FIG. 2 is a diagram showing exemplary waveforms.

FIG. 2 shows an exemplary ideal readback signal waveform 201 that corresponds to pattern data 210. Waveform 202 is an exemplary readback signal with timing, envelope offset, and envelope gain variations. In the example shown in FIG. 2, marks 212 and 218 and spaces 211, 213, 218, and 219 each have 6T run-lengths, and marks 214 and 216 and space 215 each have 3T run-lengths.

Guide edge measurement signal 220 generally corresponds to instructions for measuring the timing offset of the readback signal in order to adjust the timing loop. Thus, guide edge 221 corresponds to a transition between 6T space 211 and 6T mark 212, guide edge 222 corresponds to a transition between 6T mark 212 and 6T space 213, guide edge 223 corresponds to a transition between 6T space 217 and 6T mark 218, and guide edge 224 corresponds to a transition between 6T mark 218 and 6T space 219. Envelope measurement signal 230 generally corresponds to instructions for measuring the envelope of the readback signal.

Referring again to FIG. 1, at step 121, the readback signal is processed in accordance with the measurement instructions. Thus, step 122 may include measuring the timing offset at non-guide edge transitions in the readback signal, measuring an amplitude of the readback signal, and/or measuring any other characteristics of the readback signal. Step 123 may include measuring the timing offset of the readback signal at each edge of guide edge signal 220 (e.g., to measure the readback signal at edges 221, 222, 223, and 224 synchronized with relatively stable transitions in the pattern data to adjust the readback timing loop). Measuring a time offset in the readback signal may, for example, include measuring an amplitude of the readback signal at a time corresponding to the guide edge measurement instruction and calculating the time offset in accordance with measured amplitude. At step 125, an output of a phase locked loop (PLL) may be adjusted in accordance with the guide edge measurements (e.g., to speed up or slow down the PLL to reduce jitter in the readback signal).

As the timing offsets are measured, the OPC operation may capture the distribution as well as the mean of each edge. The distribution of each edge may be caused by timing recovery jitter due to PLL dithering, variations due to power differences during writing, and/or edge jitter due to actual mark edge jitter. It is desirable to understand the edge jitter due to actual mark edge jitter. By isolating this effect from others, it is possible to modify system parameters during writing in order to optimize edge jitter. This is especially important for phase change media optimization.

When guide edge jitter is primarily due to PLL dithering, the effect of the PLL dithering can be subtracted from the measured timing offsets of the non-guide edges by extrapolating the timing offsets between guide edges. The resulting distribution may then be used to understand and/or correct for edge jitter (e.g., using a frequency histogram).

Thus, at step 124, (corrected) offsets for the non-guide edges based on the measured offset of at least one nearby guide edge may be stored to memory. At step 130, the offsets stored in step 124 and/or other measurements may be analyzed. For example, a corrected offset may be calculated or determined by linearly extracting offset correction values for a non-guide edge based on a distance in bits from a guide edge (e.g., the nearest preceding or succeeding guide edge). Alternatively, calculating the corrected offset may comprise calculating (e.g., by linear extrapolation) an offset value for a non-guide edge based on measured timing offsets of both preceding guide edge and a succeeding guide edge.

In other examples, step 130 may include storing a plurality of time offset measurements and analyzing one or more of the measurement values to determine optimal writing characteristics to calibrate the writing process, as described in further detail in U.S. patent application Ser. No. 11/646,098, filed Dec. 26, 2006. Thus, the method may include optional step 130 to store write calibration data (e.g., the optimal characteristics and/or data that will be used later to determine the optimal characteristics).

Thus, method 100 provides for using a synchronized replica of a known written pattern as a reference during readback of the pattern from an optical storage medium. The method can pre-determine that a sample represents a particular mark/space combination, and can be used to guide the timing recovery loop. When a stable edge is chosen as this guide edge, a very stable reference can be achieved, which is used to lock the timing loop. Non-guide edge positions, derived from the pattern data, may be used to determine where expected edges are for measurement (e.g., for write calibration). The non-guide edge timing offsets may then be corrected for the effects of timing recovery loop drift based on the measured offsets of the guide edges in order to more precisely measure the effects of mark edge jitter.

The timing phase error may vary depending on the run-length of the values before and after the transition. For example, the timing phase error for a 3T mark following by a 6T space may be different than the timing phase error for a 5T space following by a 4T mark. Therefore, it is desirable to determine the optimal timing phase offset for each transition type, where there is a transition type for each combination of transitions between one run-length of marks followed by another run-length of spaces, and vice versa. For example, if the maximum run-length of the encoding system is 10, then 200 different optimal timing phase offsets may be required (because there are 100 combinations of run lengths possible, and two different transition directions [e.g., "mark" to "space" and "space" to "mark"] are possible). Therefore, in another embodiment the determining step comprises selecting an optimal timing phase offset for each transition type in the pattern data. The optimal timing phase offset may then be used when writing data to the disk to adjust the timing of transitions (e.g., to turn the write laser on and off at the optimal time). Thus, a further aspect of the present method may further include adjusting the timing phase offset, the envelope offset, and/or the envelope gain of the readback signal, for example to apply a more optimal timing offset and/or gain to the write signal.

It is also possible to use the measurement techniques described herein to measure edge timing solely on unguided data. The feature sizes on generally good data can be detected relatively easily, and such detected feature sizes can be used to classify edges. During long write operations, this "unguided edge timing" technique allows one to stop writing during the write operation, seek data backwards, read a most-recently written sequence of data, and measure the timing information. The write operation can be resumed again, optionally after making adjustments to power or timing in accordance with the disclosure.

In a further embodiment, the processing step further comprises storing to memory a timing phase error value for each transition in the pattern data. To determine the optimal timing phase offset for writing, these stored values may be processed to determine a mean timing phase error for each transition type. For example, when processing the stored value to determine optimal writing characteristics, both the pattern data and the stored timing phase error values may be read from memory. Thus, the timing phase error values can be correlated with the transition type, and a histogram of timing phase errors for each transition type can be created. The histogram can be analyzed to determine the optimal timing phase offset for writing each transition type. In addition, the data can provide valuable insight into writing characteristics such as jitter (e.g., when there is statistically significant variation in the timing phase error for a transition type). A person skilled in the art can select pattern data to gather the most necessary information. For example, the pattern data may contain a relatively large number of high frequency transitions and a relatively low number of low frequency transitions, because high frequency transitions are more commonly written.

Exemplary Software

The present invention also includes algorithms, computer programs, and/or software, implementable and/or executable in or by an apparatus containing a microcontroller, microprocessor or other instruction processor (e.g., a general purpose computer or workstation equipped with a conventional analog and/or digital signal processor), configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

Exemplary Apparatuses

FIG. 3 shows an apparatus 300 for writing to and/or reading from an optical storage medium 301. Write circuit 310 is configured to obtain pattern data from pattern source 302 and write the pattern data to optical storage medium 301. Read circuit 340 is configured to read the region of optical storage medium 301 that contains the pattern data and to produce a readback signal. Pattern analyzer 320 is configured to receive pattern data from pattern source 302' and to produce one or more measurement instruction signals in response to the pattern data.

The pattern data from pattern source 302' is generally a replica of pattern data from pattern source 302, synchronized with the data being read by read circuit 320 (e.g., so that pattern analyzer 320 has time to analyze the replica of the pattern data before the pattern is actually read from medium 301). Pattern sources 302 and/or 302' may, for example, comprise a memory, (e.g., a memory that also provides the pattern data to be written to the optical storage medium), a process, circuit, or other means for generating the pattern data according to an algorithm, a buffer (e.g., a buffer that stores pattern data that was written to the optical storage medium 101), etc. Pattern sources 302 and/or 302' may comprise the same device and/or region of a device, or may comprise distinct devices and/or distinct regions of a device (e.g., different memory locations).

Measurement circuit 321 is configured to measure one or more characteristics of the readback signal in response to the measurement instruction signals to produce one or more measurement results. Measurement analyzer 330 is configured to determine adjustments for more or more reading characteristics (e.g., characteristics for read circuit 340) in response to the measurement results.

In various embodiments, the optical storage medium 301 may comprise, for example, an optical disc such as a write-once optical disc (e.g., a CD-R, DVD-R, or DVD+R, BD-R, etc.) or a rewritable optical disc (e.g., a DVD-RW, DVD+RW, or DVD-RAM, BD-RE, etc.).

Apparatus 300 generally provides for using a synchronized replica of a known written pattern 302 as a reference during readback of the pattern from an optical storage medium 301. Pattern analyzer 320 can pre-determine that a sample represents a particular mark/space combination, and that the sample can be used to guide a timing recovery loop in or coupled to read circuit 340. When a stable edge is chosen as this guide edge, a very stable reference can be achieved, which is used to lock the timing loop. Other edge positions, derived from the pattern data, may be used to determine where expected edges are for measurement (e.g., for write calibration). The pattern data may also be used to define signal positions that can be used to determine the signal envelope for gain and offset correction, further stabilizing the measurement.

Measurement circuit 321 may be configured to measure the timing offset of the readback signal at each edge of guide edge signal 220 (e.g., to measure the readback signal from read circuit 340 (e.g., at edges 221, 222, 223, and 224 of FIG. 2, synchronized with relatively stable transitions in the pattern data to adjust the readback timing loop). Measurement circuit 321 may also be configured to measure the timing offset at non-guide edges in the readback signal (e.g., for calibrating write characteristics). Measuring a time offset in the readback signal may, for example, include measuring an amplitude of the readback signal at a time corresponding to the guide edge measurement instruction and calculating the time offset in accordance with measured amplitude.

Measurement analyzer 330 may be configured to store (e.g., in a register, memory, etc.) a plurality of guide edge and non-guide time offset measurements in accordance with the guide edge instructions, and to calculate corrected offsets for the non-guide edges as described herein. In some embodiments, measurement analyzer 330 may be configured to analyze one or more of the corrected timing offsets to determine optimal writing characteristics to calibrate the writing process, as described in further detail with respect to FIG. 3 herein and in U.S. application Ser. No. 11/646,098, filed Dec. 26, 2006. Thus, measurement analyzer 330 may be configured to store write calibration data 303 (e.g., the optimal characteristics and/or data that will be used later to determine the optimal characteristics).

Figure 4:
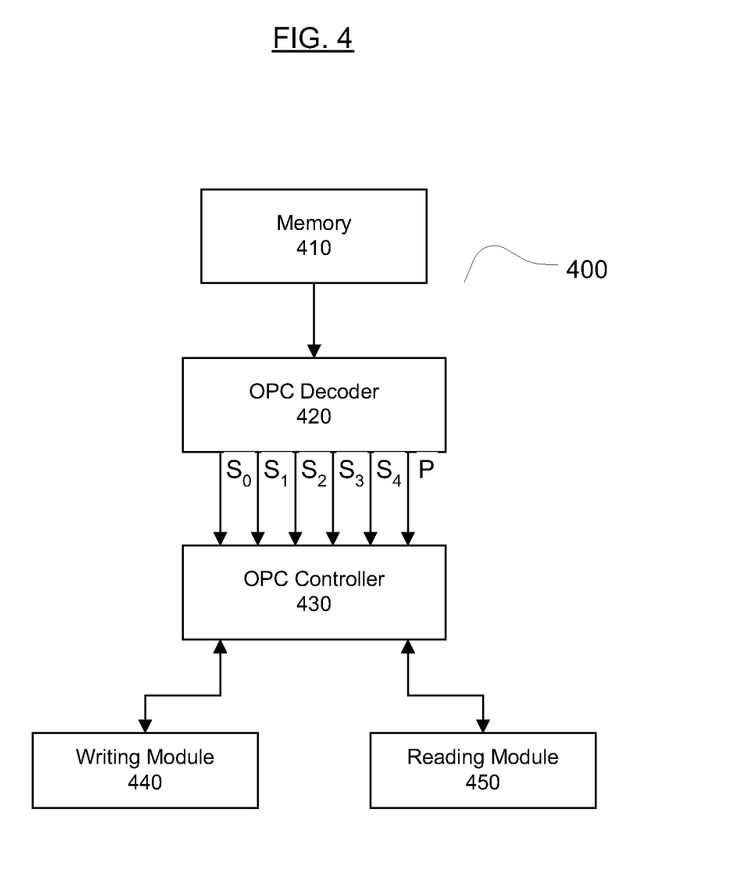
FIG. 4 is a diagram showing an exemplary apparatus for processing a calibration bitstream according to an embodiment of the present invention.

FIG. 4 shows an exemplary apparatus 400 for extracting pattern data and/or write instructions from a calibration bitstream. Thus, pattern sources 102, 302, and/or 302' as described herein may comprise apparatus 400. Memory 410 is generally configured to store data corresponding to a calibration bitstream. Memory 410 may comprise random access memory (RAM), nonvolatile memory such as flash memory, read only memory (ROM), and/or other suitable electronic data storage. Memory 410 generally provides the calibration bitstream to OPC decoder 420 (e.g., via a parallel data bus and/or a serial communications channel).

OPC decoder 420 is generally configured to extract calibration pattern data and calibration instructions from the calibration bitstream. The calibration instructions may be substantially synchronized with the calibration pattern data. Therefore, OPC decoder 420 may provide a plurality of output signals $S_0$ through $S_4$ corresponding to instructions encoded with the pattern data, as well as signal P corresponding to the pattern data. OPC decoder 420 may be implemented with dedicated circuitry (e.g., in an application specific integrated circuit, or in a functional circuit block within a larger integrated circuit receiving and/or processing data from memory 410 or from a larger memory containing memory 410), but may also be implemented in software for a microcontroller or microprocessor. OPC controller 430 may receive signals $S_0$ through $S_4$ and pattern data P, and control write module 440 and read module 450 to determine an optimal write characteristic using the instructions and pattern data.

Exemplary Systems

Figure 5:
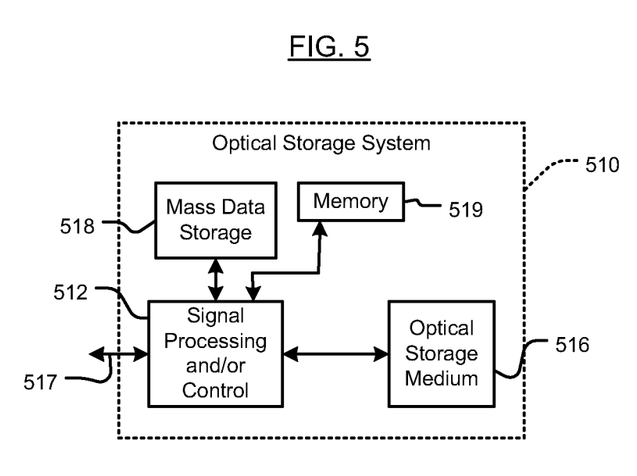
FIG. 5 is a diagram of an exemplary optical storage device.

Referring now to FIG. 5, the present invention can be implemented in an optical storage (e.g., CD, DVD, BD, etc.) system 510. The signal processing and/or control circuit 512 and/or other circuits in system 510 may include the OPC circuits and/or may implement the OPC operations presented herein, and may also process data, perform coding and/or encryption, perform calculations, and/or format data that is read from and/or data written to an optical storage medium 516. In some implementations, the signal processing and/or control circuit 512 and/or other circuits (not shown) in system 510 can also perform other functions such as encoding and/or decoding and/or any other signal processing functions associated with an optical storage system.

System 510 may communicate with an output device (not shown) such as a computer, television or other device via one or more wired or wireless communication links 517. System 510 may be connected to memory 519 such as RAM, ROM, nonvolatile memory such as flash memory and/or other suitable electronic data storage.

CONCLUSION/SUMMARY

Thus, the present invention provides methods, software, and apparatus for the calibration of timing offsets for writing to an optical storage medium. The present invention advantageously provides the ability to precisely measure timing offsets caused by variations in the optical storage medium and/or the writing characteristics used, and to correct the measured offsets for timing offsets attributable to drift in the timing loop or to other factors that may be independent of variations in the medium and/or writing characteristics. For example, determining standard deviations of the edges of read-back data can be a useful guide for power calibration. By separating out the effects of edge to edge variations from the variation in an edge type itself, it is possible to determine a minimum power that gives acceptable jitter. For media that can be read from and written to, a low power in read/write operations can be quite advantageous, because a relatively high power can limit the number of possible overwrites. As a result, a sensitive and/or robust measurement of the actual jitter (as determined using certain edge-to-edge data transition measurements) is advantageous for power calibration on phase change media (e.g., optical data storage media).

The present invention further provides for effective correction of a readback signal (e.g., reduction of jitter) during reading data that may have been written under a variety of conditions (e.g., calibration pattern data written to the optical storage medium using several different writing power levels, timing offsets, etc.). Thus, the present invention provides for highly stable measurement of variations in the readback signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of correcting read operations from and/or write operations to an optical storage medium, the method comprising:

reading a region of an optical storage medium to produce a readback signal, wherein the readback signal comprises a plurality of edges including one or more non-guide edges;
measuring timing offsets for at least a first one of the non-guide edges and at least a second one of the plurality of edges, each of edges that are not non-guide edges corresponding to a transition between a first mark and a first space both having a same run length, each of the non-guide edges corresponding to a transition between a second mark and a second space, the run length being greater than a run length of at least one of the second mark and the second space; and
storing an offset correction for at least one of the plurality of edges based on a measured offset of at least the first one of the non-guide edge or at least the second one of the plurality of edges relative to a predetermined offset.

2. The method of claim 1, wherein the second one of the plurality of edges includes one or more second non-guide edges, and the offset correction is based on the measured offset of at least the first one of the non-guide edges and at least one of the one or more second non-guide edges.

3. The method of claim 1, wherein the second one of the plurality of edges includes one or more guide edges, and the offset correction is based on the measured offset of at least the first one of the non-guide edges and at least one of the one or more guide edges.

4. The method of claim 3, further comprising calculating a corrected offset by linearly extracting an offset correction value for the at least one non-guide edge based on a distance in bits from the one or more guide edges.

5. The method of claim 3, wherein calculating the corrected offset comprises calculating an offset value for the at least one non-guide edge based on measured timing offsets of a preceding guide edge and a succeeding guide edge.

6. The method of claim 5, wherein calculating the corrected offset comprises linearly extracting the offset correction value based on a distance in bits from the preceding guide edge and a distance in bits from the succeeding guide edge.

7. The method of claim 3, further comprising:
measuring timing offsets for a plurality of the guide edges and a plurality of the non-guide edges; and
calculating offset corrections for each of the plurality of non-guide edges based on measured offsets of the plurality of guide edges.

8. The method of claim 7, further comprising calculating at least one timing offset for writing data to the optical storage medium based on the offset corrections.

9. The method of claim 7, further comprising:
determining a transition type for each of the non-guide edges; and
correlating the offset corrections for each of the non-guide edges with the transition type.

10. The method of claim 9, wherein the transition type corresponds to a run length of a first mark and/or space in the optical storage medium before a transition and a run length of a second mark and/or space in the optical storage medium after the transition.

11. The method of claim 9, further comprising calculating at least one timing offset for writing data corresponding to one of the transition types based on the corrected offsets.

12. The method of claim 7, further comprising extrapolating the timing offsets between the plurality of guide edges and subtracting the extrapolated timing offsets from the measured timing offsets of the non-guide edges to calculate an edge jitter that is independent of errors in placement of specific edges.

13. The method of claim 1, wherein the region includes predetermined pattern data.

14. The method of claim 13, further comprising:
processing the predetermined pattern data to produce one or more measurement instructions; and
measuring the timing offsets in response to the measurement instructions.

15. The method of claim 14, wherein the second one of the plurality of edges further includes a guide edge, and processing the predetermined pattern data comprises finding a mark/space combination in the predetermined pattern data corresponding to the guide edge and producing a guide edge measurement instruction in response thereto.

16. The method of claim 13, further comprising:
writing the pattern data to the region of the optical disc before reading the region of the optical disc in accordance with calibration instructions;
receiving a bitstream comprising the calibration instructions and the pattern data, wherein the bitstream comprises the calibration instructions superimposed on the pattern data; and
measuring the timing offsets in accordance with the calibration instructions.

17. The method of claim 16, further comprising correlating corrected offsets for one or more of the non-guide edges with one or more of the calibration instructions.

18. The method of claim 16, further comprising correlating corrected offsets for one or more of the non-guide edges with one or more run lengths in the predetermined pattern data.

19. The method of claim 1, further comprising adjusting an output of a phase locked loop (PLL) in accordance with at least one of the timing offsets.

20. An apparatus for reading from and/or writing to an optical storage medium, the apparatus comprising:
a reading module configured to read a region of the optical storage medium to produce a readback signal, wherein the readback signal comprises a plurality of edges including one or more non-guide edges;
a measurement module configured to measure timing offsets for at least a first one of the one or more non-guide edges and at least a second one of the plurality of edges, each of edges that are not non-guide edges corresponding to a transition between a first mark and a first space both having a same run length, each of the non-guide edges corresponding to a transition between a second mark and a second space, the run length being greater than a run length of at least one of the second mark and the second space; and
logic configured to calculate a corrected offset for at least one of the plurality of edges based on a measured offset of at least the first one of the one or more non-guide edges or the second one of the plurality of edges.

21. The apparatus of claim 20, wherein the second one of the plurality of edges includes one or more guide edges, and the logic is further configured to linearly extract an offset correction value for the first non-guide edge based on a distance in bits from at least one of the one or more guide edges.

22. The apparatus of claim 20, wherein the second one of the plurality of edges includes a plurality of guide edges, and the logic is further configured to calculate an offset value for the first non-guide edge based on measured timing offsets of a preceding guide edge and a succeeding guide edge.

23. The apparatus of claim 22, wherein the logic is further configured to linearly extract the corrected offset based on a distance in bits from the preceding guide edge and a distance in bits from the succeeding guide edge.

24. The apparatus of claim 20, wherein the region includes predetermined pattern data.

25. The apparatus of claim 24, further comprising a pattern processing module configured to process predetermined pattern data to produce one or more measurement instructions, wherein the region of the optical storage medium includes the predetermined pattern data and the measurement module is further configured to measure the timing offsets in response to the measurement instructions.

26. The apparatus of claim 25, wherein the pattern processing module is further configured to
find a mark/space combination in the predetermined pattern data corresponding to the guide edge; and
produce a guide edge measurement instruction in response thereto.

27. The apparatus of claim 24, further comprising a writing module configured to write the predetermined pattern data to the optical storage medium in accordance with calibration instructions.

28. The apparatus of claim 27, wherein the logic is further configured to correlate corrected offsets for one or more of the non-guide edges with one or more of the calibration instructions.

29. The apparatus of claim 27, wherein the controller is further configured to correlate corrected offsets for one or more of the non-guide edges with one or more run lengths in the predetermined pattern data.

30. The apparatus of claim 20, wherein:
the read module further comprises a phase locked loop (PLL); and
the logic is further configured to provide a PLL adjustment signal to the PLL in accordance with the timing offsets for one or more of the guide edges.

31. The apparatus of claim 20, wherein:
the measurement module is further configured to measure the timing offsets for a plurality of the guide edges and a plurality of the non-guide edges; and
the logic is configured to calculate corrected offsets for each of the plurality of non-guide edges based on measured offsets of one or more of the plurality of guide edges.

32. The apparatus of claim 31, wherein the logic is further configured to calculate at least one writing characteristic for writing data to the optical storage medium based on the corrected offsets.

33. The apparatus of claim 31, wherein the logic is further configured to:
determine a transition type for each of the non-guide edges; and
correlate the corrected offsets for each of the non-guide edges with the transition type.

* * * * *